United States Patent [19]
Tupper

[11] 3,881,744
[45] May 6, 1975

[54] AUTOMOBILE PASSENGER RESTRAINT
[75] Inventor: Earl Silas Tupper, Panama, Panama
[73] Assignee: TUP! (Panama) S.A., Panama City 5, Panama
[22] Filed: Dec. 26, 1972
[21] Appl. No.: 318,327

[30] Foreign Application Priority Data
Dec. 22, 1971 United Kingdom............... 59542/71

[52] U.S. Cl............................................. 280/150 B
[51] Int. Cl.......................................... B60r 21/02
[58] Field of Search..................... 280/150 B, 150 SB

[56] References Cited
UNITED STATES PATENTS
3,799,572  3/1974  Hollins ............................ 280/150 B
FOREIGN PATENTS OR APPLICATIONS
264,159  12/1964  Australia......................... 280/150 B
1,563,629  3/1969  France ............................ 280/150 B
1,003,534  9/1965  United Kingdom............. 280/150 B Primary Examiner—Robert R. Song
Attorney, Agent, or Firm—Pollock, Philpitt & Vande Sande

[57] ABSTRACT

Passenger restraint means are provided in an automobile by a frame, pivoted around a transverse axis, carrying a resilient waist-restraint region. The seat cannot be occupied until the frame is pivoted upwards, but the driver vision is obscured until the frame is again pivoted downwardly, over the legs of the occupant, and restrains him by the waist. Additional accommodation of impact is provided by mounting the frame on upstanding arms connected to a transverse torsion bar. Such mounting is preferably by a breakaway joint pivot for easy removal after collision.

Figure 3:
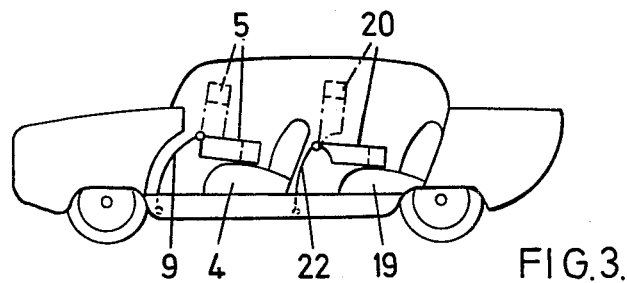

4 Claims, 5 Drawing Figures 3,881,744

AUTOMOBILE PASSENGER RESTRAINT

This invention relates to passenger restraint means for incorporation into automobiles or the like.

It is well known to provide seat belts which restrain passengers from flying forward in the event of a collision. Although the proper use of seat belts is valuable to safeguard the passengers against injury, it has been found that most passengers do not strap themselves in. Investigations have been made into forms of automatic restraint systems, either based on existing designs of seat belt (whether waist belt or shoulder belt) which, for example are connected into the electrical system of the car and prevent starting the car until all seat belts are in use, or based upon inwardly projecting restraint arms fastened to the inside of the doors to extend in front of the passenger when the door is closed. It has also been proposed to provide inflateable air bags which inflate rapidly upon impact of the vehicle during a collision and provide a pneumatic restraint.

The above methods, while to a greater or lesser extent effective, are either too complex mechanically or elctrically or themselves tend to cause injury to the passenger, especially in the case of inflateable air bags which can cause permanent deafness and can be triggered accidentally.

The present invention sets out to overcome the above disadvantages by providing a relatively wide resilient restraint region for the waist of a seated person, carried upon a substantially continuous frame which is pivotable about a transverse axis either to a lowered position in which it overlies the seat of the vehicle or to a raised position; the lowered position preventing a person from using a seat until the frame is raised and/or the raised position obscuring forward or rearward driver vision until the frame is again lowered over the person's legs to restrain him at the waist.

Thus, the frame must be lifted to permit the person to sit in the seat, and must be folded down again over the legs to restrain the waist of the person once he is sitting, assuring that the restraint means is always operative in a moving vehicle. The frame can either be such as only to prevent a person sitting in the seat until raised (in which case it is preferable for the frame to be biased to the downward position so that when the passenger sits in the seat the frame tends to rest across his legs) or only so as to obsure the front or rear vision of the driver when in the raised position. Preferably it has both functions.

When the frame is for use in the front seat of a car, it will preferably be shaped so that when folded upwards it can accommodate the driving wheel, and when folded downwards it still permits access to any gear lever or like control.

According to the invention, the resilient restraint region is relatively wide, usually from about 3 to 9 inches in width. This is adequate to encompass the waists of persons of widely differing sizes.

The restraint region can either be a layer of padding, or be a layer of webbing supported, for example, on an inertial reel and if necessary supplemented by a layer of padding. It will be found preferable if the restraint region is concave.

Generally speaking, the frame is in the form of a continuous tray or box. If desired the upper surface of the box can be padded so that if the person is thrown forward his head will not strike any hard surface. Alternatively or additionally there may be a flat region provided as a support frame or map rest.

Another optional feature of the invention, which is of value in accommodating impact of a person against the frame, is to mount the frame upon a torsion bar (for example by the intermediary of upstanding, usually curved arms attached to each end thereof extending across the vehicle and clamped intermediate its ends). By this expedient the weight of the passenger is thrown first against the resilient restraining surface and then, as pressure increases, is accommodated by torsion of the bar.

Another valuable feature of the present invention is preferably although not essentially used in combination with such a torsion bar mounting. It involves the provision of a breakaway joint at each side of the frame where it is attached to the mounting. Since the frame, because of its continuous nature, is a fairly large object, it should preferably be easily removable from a crashed car, and the provision of an unlatchable or otherwise easily detachable joint of at least one end and preferably both ends of the frame will materially assist in removing the frame from the wreckage.

While the invention is primarily concerned with the provision of passenger restraint means as described above, it will be appreciated that the car provided with such passenger restraint means (either assembled during production, or as an optional extra added after production) is a feature of the invention.

Figure 1:
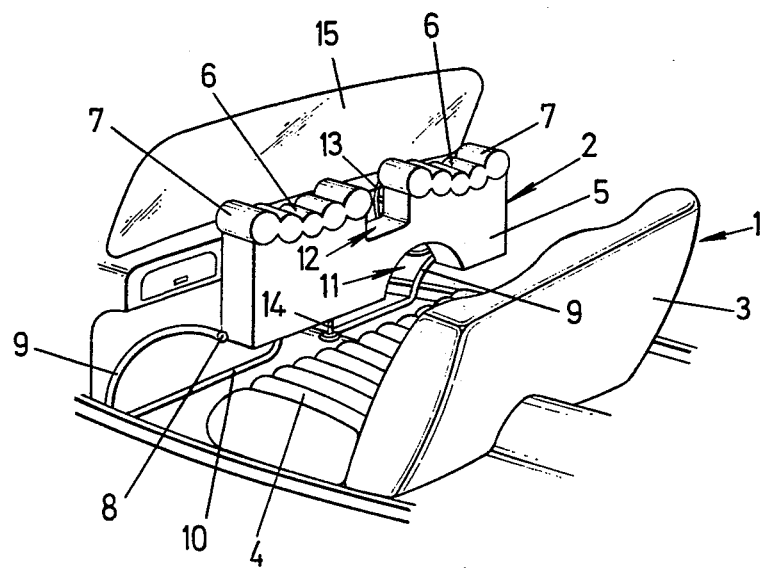
Figure 2:
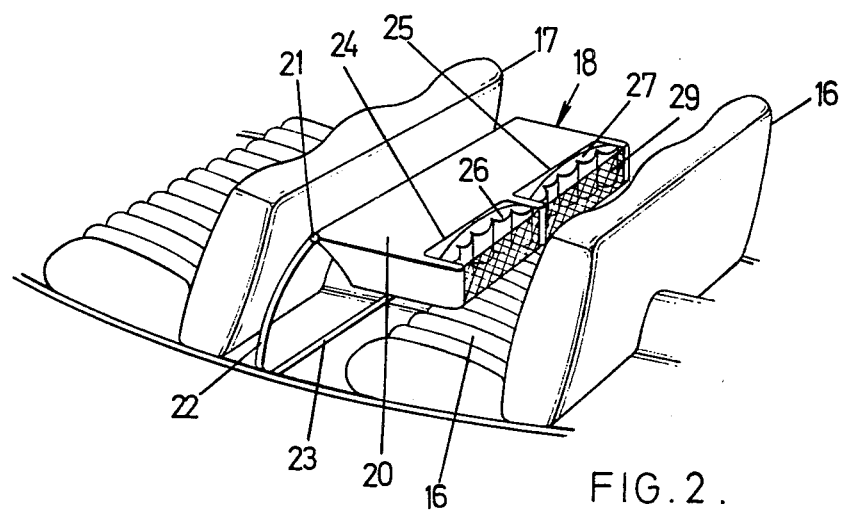
Figure 4:
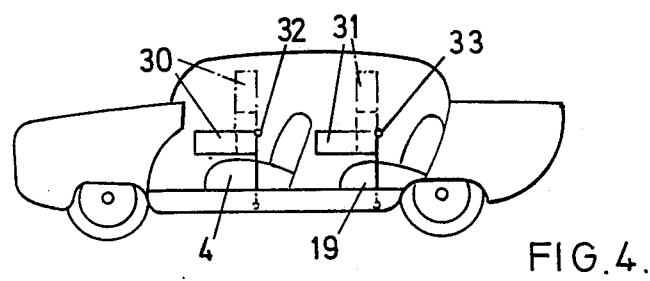
Figure 5:
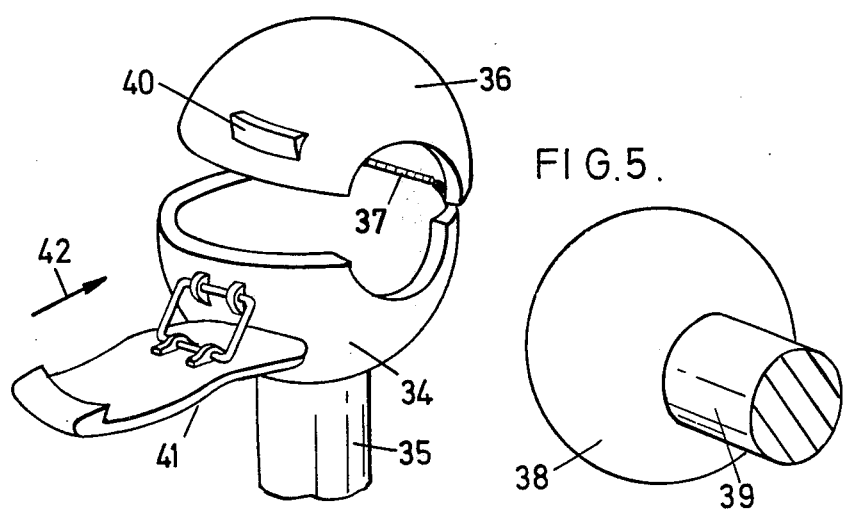

The invention will be further described with reference to the accompanying drawings, in which:

FIG. 1 is a perspective view of a passenger restraint according to one embodiment of the invention, FIG. 2 is a perspective view of a passenger restraint according to another embodiment of the invention, FIG. 3 is a line diagram showing the type of restraint illustrated in FIGS. 1 and 2 in relation to the seats in the vehicle, FIG. 4 is a line diagram of an alternative form of passenger restraint in relation to the seats in the vehicle, FIG. 5 is a perspective view of a type of disengageable fastening for the passenger restraint.

In FIG. 1 there is shown the front seat of an automobile 1 and a passenger restraint 2. The seat consists of a back portion 3 and a seat portion 4. The passenger restraint 2 consists of a transverse frame constituted by a tray or box member 5 and two concave regions 6 each provided with a restraint region formed as a layer of padding material 7. The tray or box member 5 is hinged at 8 so that it can either be folded upwards (to a raised position as shown) or downwards (to lie in a lowered position parallel to the seat portion 4). In the embodiment shown, the box or tray portion 5 is hinged to two curved arms 9 mounted on either end of a torsion bar 10 extending across the automobile and fastened by conventional clamps (not show) at a portion near its middle. The box or tray portion 5 is also provided with two cut-away portions 11 and 12 to accommodate the steering wheel 13 (when the box or tray 5 is folded upwards) and to allow the driver to reach the gear lever 14 (when the box or tray is folded downwards).

As will be apparent from FIG. 1, while it is readily possible for the driver or a front seat passenger to sit in seats with the box or tray folded upwards, the driver will find it impossible to drive the car in this position since he will not be able to reach the wheel and his vision will be obscured by the box or tray 5 blocking the windscreen 15. When the tray 5 is folded downwards there is provided a suitable platform for both the front seat passenger and the driver upon which the arms can be rested or a book or map can be spread out. Moreover, the relatively wide padded portions 7 provide a suitable safe restraint around the waist regions of both driver and passenger. If necessary the top part of the tray, i.e., that face not shown in FIG. 1, can also be padded so that if the driver or his passenger are thrown forward on impact, they will only encounter padded surfaces.

The use of torsion bar 10 across the vehicle also assists in accommodating the force of any impact.

FIG. 2 shows a rather similar system applied to the rear seat of an automobile. The automobile is provided with a rear seat 16 and a front seat 17, and a passenger restraint means 18 which can be folded down as shown in FIG. 2 to overlie the seat portion 19 of the rear seat 16. The box or tray portion 20 of the passenger restraint means 18 is again mounted by a hinge 21 upon curved arms 22 fixed to torsion bar 23. It will be apparent that in the embodiment shown there is a gap between the hinge edge of the box or tray 20 and the rear of the front seat 17.

The box or tray 20 is provided with two passenger restraint portions 24 and 25. Each of these is formed as a concave padded region (26 and 27) and a strap of webbing (28 and 29) which in the embodiment shown is supported by an inertial reel system which will yield under gentle pressure but not under sudden sharp pressure.

It will be apparent that the box or tray portion 20 can be lifted up to allow passengers to sit in the rear seat. Since in this position it would obscure rear vision of the driver, it must be folded down to overlie the legs of the passengers before the car can be driven. It is envisaged in any case that the box or tray portion 20 will usually be mounted so that it will tend by force of gravity to adopt the position shown in FIG. 2, and would therefore need to be positively held up by the passengers in the back seat when it is desired to fold it upwards.

As before, impact is accommodated by the curved portions 27 and the associated padding. In this instance the provision of an inertial reel-mounted strap of webbing or the like provides an additional restraint means of a nature which allows for the passenger to move about in comfort while the car is travelling. Impact is additionally accommodated by the mounting of the box or tray member 20 upon the torsion bar 23 by means of the curved arms 22. Torsion of the bar 23 must take place before the tray is thrown against the back of the front seat 17.

FIG. 3 is a line diagram which shows the location of the hinged box or tray portions such as shown at 5 and 20, both when in the downward position (with a dotted line indicating the maximum forward extension of the concave portion) and in the upwardly folded position, itself shown in dotted lines, which indicates how visibility is obscured unless the passenger restraint means are in their correct places. In FIG. 3 the box or tray portions 5 and 20 are shown as contacting the seats 4 and 19 respectively, and it will be appreciated that in this embodiment, when a passenger is sitting in the seats, they will be somewhat depressed and the tray or box will rest upon the legs of the traveller and will provide a relatively broad band of restraint around the waist region in case of impact.

FIG. 4 shows an alternative form of passenger restraint which again has box or tray portions (30 and 31 respectively) overlying the seat portions 4 and 19, but is in this instance the restraint is hinged at 32 and 33 respectively so that it must be folded forward over the passenger's head to take up its position and to allow clear rearward vision for the driver. Once again, such a system can be mounted upon a torsion bar extending transversely within the vehicle.

It will be apparent to the man skilled in the art that various systems can be used in whatever combinations are most suitable having regard to the detailed internal configuration of a given vehicle. Moreover, additional padding to that shown can be provided, especially upon the upper surfaces of the tray or box portions when these are in their restraint positions. Moreover, while in the embodiments shown the box or tray portions are mounted upon torsion rods to accommodate the impact, this is not strictly necessary.

FIG. 5 shows a typical form of mounting which can be used for the box or tray portion. If the vehicle should be involved in an accident, to overcome any problem in removing the relatively large passenger restraint system now envisaged it is preferable to provide a simple disengageable joint whereby the box or tray portion can be unclipped and lifted out bodily. A typical such joint is shown in FIG. 5. It consists of a cup 34 integral with a vertical support 35 (for example the upper part of the arms 9 or 22) and having a further hemispherical cup 36 hinged over it at 37. The hemispherical cups 34 and 36 are provided with semi-circular apertures so that when the cups are closed there is defined a circular hole. Thus, the cup can accommodate the ball joint 38 integral with transverse rod 39 upon which the box or tray portion 5 or 20 can be hinged.

The upper hemispherical cup 36 is provided with a catch 40 and the lower cup with a toggle connection generally indicated at 41. Thus, the catch 40 and toggle 41 will provide a known form of readily engageable or disengageable connection such as is conventional, for example, upon large trunks or suitcases.

In the event of an impact, the force upon the joint will be in the direction of the large arrow 42. This will press upon the hinge region of the hemispherical cups 34 and 36, and will not tend to open the joint, so that the passengers will be restrained against impact. However, to remove the passenger restraint means, the lower portion of the toggle 41 need only be pulled outwardly away from the ball and socket joint when the joint will open and the ball 38 will be readily removable.

I claim:

1. In an automobile, a passenger restraint means comprising: a substantially continuous frame extending transversely within said automobile, a pivot axis for said frame also extending transversely within said automobile, whereby said frame can be pivoted between a raised position and a lowered position overlying a seat of said automobile, two upstanding arms, each providing a pivot at an upper end located one at each end of said pivot axis, a torsion bar clamped to said automobile intermediate its ends and holding at said ends the lower ends of said upstanding arms, and a substantially vertical resilient concave restraint region extending transversely across, and carried upon, said frame to restrain a seated person at the waist, whereby said seat cannot be occupied until the frame is pivoted upwards therefrom, and driver vision is obscured until said frame is again pivoted downward and lowered over the occupant's legs to restrain him at the waist.

2. In an automobile, a passenger restrain means as claimed in claim 1, wherein said frame is shaped with a gap to provide access to a gear lever when folded downwards and shaped with a recess to accommodate a steering device when folded upwards, so that it is suitable for use across a front seat of said automobile.

3. In an automobile, a passenger restraint means as claimed in claim 1, wherein said restraint region is from 3 to 9 inches wide.

4. In an automobile, a passenger restraint means as claimed in claim 3, wherein said restraint region comprises a layer of webbing.

* * * * *